United States Patent [19]
Enters

[11] 3,918,990
[45] Nov. 11, 1975

[54] ALKALINE STORAGE BATTERY AND ZINC NEGATIVE ELECTRODE THEREFOR

[75] Inventor: Robert F. Enters, Hackensack, N.J.

[73] Assignee: McGraw-Edison Company, Elgin, Ill.

[22] Filed: Oct. 25, 1974

[21] Appl. No.: 518,091

[52] U.S. Cl. .................................. 136/28; 136/30
[51] Int. Cl.² ........................................ H01M 4/38
[58] Field of Search ............... 136/30, 28, 125, 130

[56] References Cited
UNITED STATES PATENTS

| | | | |
|---|---|---|---|
| 2,636,059 | 4/1953 | Garine | 136/30 |
| 3,069,486 | 12/1962 | Solomon et al. | 136/30 |
| 3,672,998 | 6/1972 | Darland, Jr. | 136/30 |
| 3,674,563 | 7/1972 | Bennett | 136/125 X |
| 3,785,867 | 1/1974 | Edwards et al. | 136/28 X |

Primary Examiner—John H. Mack
Assistant Examiner—C. F. Lefevour
Attorney, Agent, or Firm—George H. Fritzinger

[57] ABSTRACT

An alkaline-electrolyte storage battery having nickel and zinc active materials for the positive and negative electrodes is characterized by the use of perforated metal strip pockets for the negative electrodes containing a powdered zinc active material under pressure to hold the active material in situ and in close electrical contact with the metal strip. By preventing loss of active zinc material during cycling, a greatly extended cycle life is obtained at nearly the initial electrical capacity of the battery.

5 Claims, 7 Drawing Figures

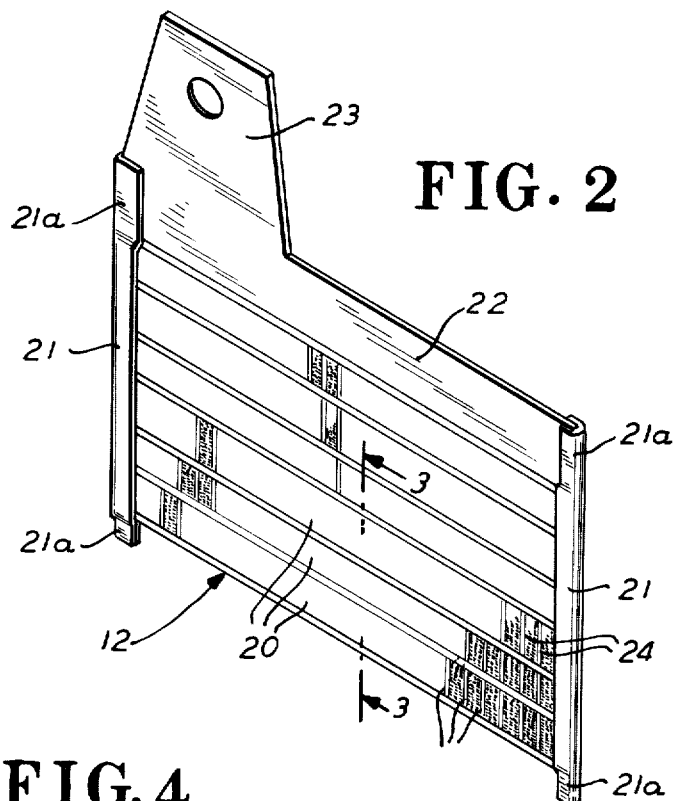
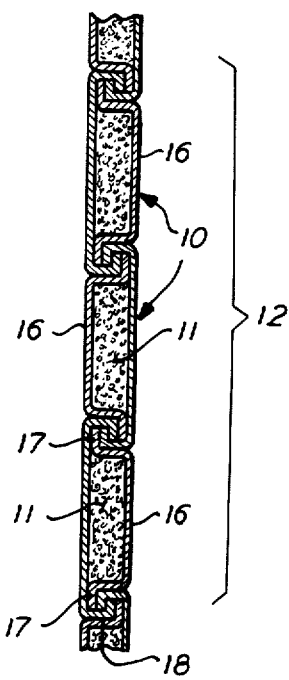
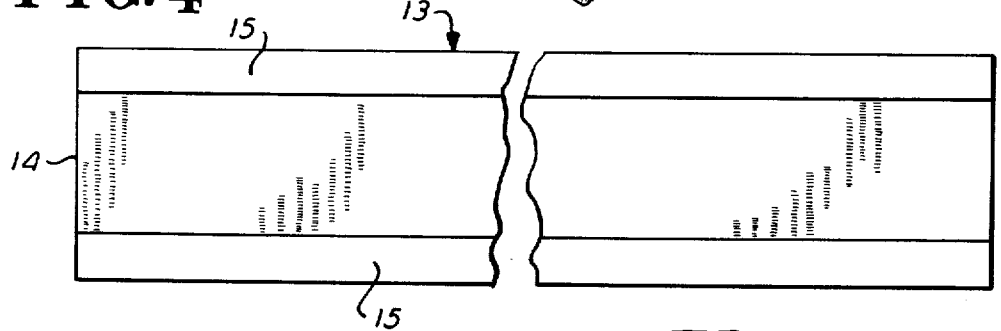
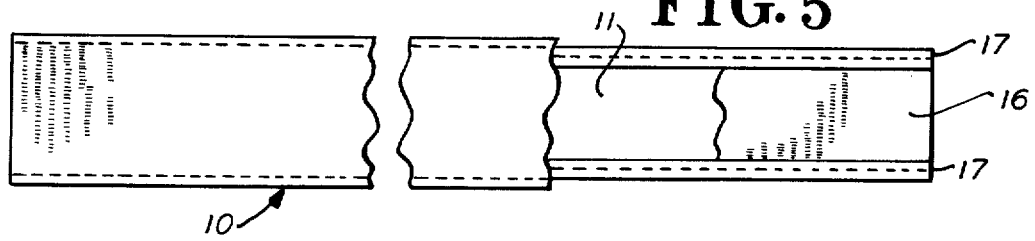
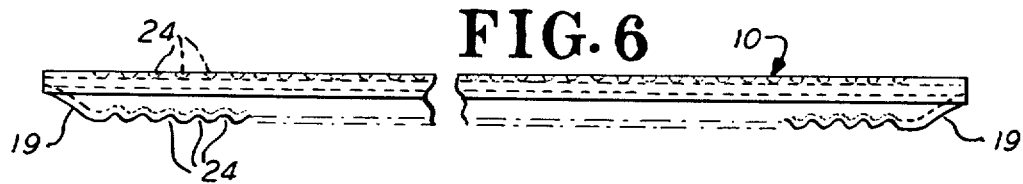

ALKALINE STORAGE BATTERY AND ZINC NEGATIVE ELECTRODE THEREFOR

Heretofore, zinc electrodes for silver-zinc and nickel-zinc couples have involved (1) pressing of dry zinc powders, (2) pasting of slurries of zinc powder, or (3) electroplating zinc on conductive plates. In each of these fabrications there has been produced exposed zinc electrodes wherein the zinc is held in place by a screen or grid acting as a current collector. The fabricated electrodes are covered or wrapped with paper or Cellophane to hold the zinc in place during cycling. These prior fabrications have suffered from an effective loss of active zinc during cycling as a consequence of a distorting of the electrodes — i.e., bulging, shrinking and warping —, a densification or settling of the zinc powder, a gradual loss of electrical contact of the zinc powder with the grid, and simply an escaping or drifting of the zinc powder from the grid structure where it no longer serves as an active element of the battery.

In the present improved zinc negative electrode the active zinc material is contained in a perforated metal strip pocket wherein it is maintained under pressure and kept not only in situ but also in constant uniform electrical contact with the perforated metal strip acting as a current collector for the electrode. In this new construction there is little or no loss of zinc active material from the battery electrode system during cycling with the result that the cycle life of the battery is greatly extended to achieve a practical long-life nickel-zinc storage battery.

Objects of the invention are to provide an improved zinc electrode for a nickel-zinc battery and an improved battery containing such novel zinc electrode which is operative at well-nigh full initial capacity during repeated cycling.

Another object is to provide such zinc electrode wherein perforated metal strip pockets are filled with zinc powder under pressure, and this pressure is maintained throughout the cycling of the battery to keep the zinc powder in place and in uniform electrical contact with the metal pocket serving as a current collector.

Another object is to provide such perforated metal strip pockets which, after being filled with zinc powder, are crimped to densify the powder and to lock the powder in place to maintain the capacity of the battery throughout repeated cycling.

These and other objects and features of the invention will be apparent from the following description and the appended claims.

In the description of my invention reference is had to the accompanying drawings, of which:

FIG. 2 is a perspective view of a zinc negative electrode of the battery according to the invention, comprising a plurality of parallel strip pockets seamed together along their edges into a plate structure;

FIG. 3 is a fractional sectional view to enlarged scale through the negative plate structure taken on the line 3—3 of FIG. 2;

FIG. 4 shows one of the perforated metal strips from which the strip pockets are made;

FIG. 5 is a view of a partially assembled strip pocket comprising a channel strip containing a briquette of compressed zinc active material and a cover strip in slidable telescoping arrangement therewith; and FIG. 6 is a side view of a finished strip pocket ready for being seamed with a plurality of such pockets into a plate structure.

Figure 1:
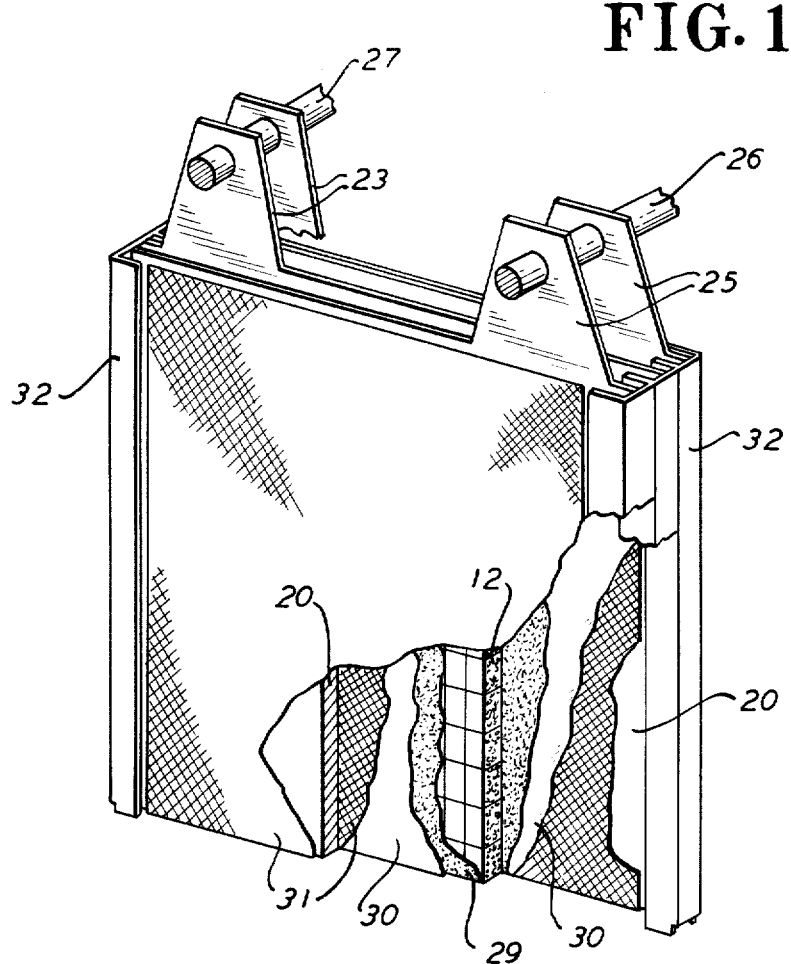
FIG. 1 is a perspective view, partly broken away, of a nickel-zinc storage battery incorporating the invention.

In fabricating the novel zinc electrode according to the invention, strip pockets 10 as shown in FIGS. 3 and 5 are first formed, filled with zinc active material 11, and then seamed along their edges to form the plate structure 12 shown in FIG. 2. Each strip pocket is made from two metal strips 13 (FIG. 4) having a central perforated band portion 14 lengthwise thereof and having imperforate border portions 15 along the sides. These strips are made of nickel-plated steel of 2 to 5 mil thickness, having 3 to 15 mil perforations. One of these strips 13 is formed into a channel 16 (FIGS. 3 and 5) by bending the solid border portions 15 at right angles and the edges thereof then outwardly so that the perforated band 14 forms the bottom wall of the channel and the solid border portions 15 form the side walls with outwardly-extending flanges 17. The other metal strip 13 is a cover strip having the solid border portions 15 curled back on themselves to form guideways 18 lengthwise of the strip. These two strips are telescoped together as shown in FIGS. 3 and 5 with the side flanges 17 of the channel members engaging the guideways 18 of the cover strip.

Before the channel members and cover strips are telescoped together the channel members are filled with zinc active material 11 preferably comprising a mixture of powdered zinc and zinc oxide including a small amount up to 5% by weight of mercuric oxide and a binding agent up to 3% by weight such as polyvinyl-pyrolidone. This active material may be in powdered form or it may be compressed into a rectangular briquette form to fit the channels 16 as shown in FIG. 5. After the channel members and cover strips are telescoped together to form a strip pocket containing the zinc active material 11, the ends 19 are crimped closed to form a finished strip pocket 10 as appears in FIG. 6.

A plurality of finished strip pockets 10 are seamed together along their edges to form the plate structure 12 shown in FIG. 2. The seaming is done by interengaging the guideways 18 of successive strip pockets edgewise in a hooked arrangement as shown by the sectional view of FIG. 3. After a group of such finished strip pockets are so engaged with each other in a planar arrangement, U-shaped channel members 21 of nickel-plated steel are crimped tightly onto the end portions of the finished pockets within the thickness dimension of the pockets. Further, extensions 21a of the U-shaped channel members 21 are crimped onto and welded to relatively heavy metal strips 22 completing the frames for the zinc negative electrodes. Each metal strip 22 has an extending tab or leg 23. However, after the group of finished strip pockets are secured in plate form to the U-channel members 21 and metal strips 22, the strip pockets are subjected to a compressive operation to form the plate structure with transversely corrugated walls 24 so as to tightly compress the zinc active material in the pockets into electrical contact with the perforated metal strips and so as to confine the successive portions of the active material against displacement or migration during the cycling of the battery.

Figure 1A:
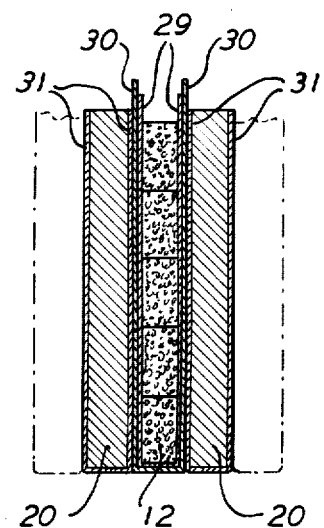
FIG. 1A is a fractional section on the line 1A—1A of FIG. 1.

A typical nickel-zinc pocket-type battery according to the invention comprises a succession of alternate nickel positive plates 20 and intervening zinc negative plates 12 in a parallel side-by-side arrangement as shown in FIGS. 1 and 1A. As is common, the successive plates are oriented so that the terminal lugs 25 of the positive plates are aligned along one end of the battery for connection via a strap or rod 26 to a positive terminal, and the terminal lugs 23 of the negative plates are aligned along the opposite end of the battery for connection via a strap or rod 27 to a negative terminal. Each negative plate 12 is covered by a single-layer felt separator 29 of about 25 mils thickness applied down across one side of the plate, around the bottom edge, and then up across the other side. Next, an ionic membrane separator, typically a Cellophane tape 30 of about 1½ mil thickness is wrapped vertically around the felt-covered zinc negative plate with an overlap of the successive convolutions to constitute, in effect, a three-wrap covering. Each positive nickel plate is covered across one side, and around the bottom edge and up the other side by a semiflexible plastic mesh insulator 31 typically of polyethylene. Prior to placing these plates in a pack against one another face to face, molded plastic U-channel members 32, typically of polystyrene, are pressed onto the opposite vertical edges thereof in clamping engagement therewith. The plates are packed together with the end U-channel members applied side by side against each other and with these channel members forming a slight spacing between the plates for better flow of electrolyte to all surfaces of the plates.

In this battery construction the active zinc material is retained in situ in perforated metal strip pockets without loss of electrical contact with the perforated metal walls, with the end result that the voltage and ampere hours capacity of the battery are maintained at well-nigh their starting values after repeated cycling of the battery. No prior nickel-zinc battery is known wherein the zinc powder has been so effectively retained in the battery system to produce such superior results. Although one cannot be certain as to the exact way in which the zinc active material is so efficiently retained in the battery system, it is believed to be due (1) to starting with a zinc-active material in a powder form, (2) packing this powdered material in long, thin metal strip pockets without inclusion of any substantial inert material, (3) using such strip pockets that when compressed will maintain the active material under pressure, (4) corrugating the walls of the strip pockets in the compressive operation so as to effectively isolate successive portions of the active material against settling or migration, and (5) forming the metal strips constituting the pocket walls with perforations of a size compared to that of the active zinc particles which permits ingress of electrolyte but no substantial loss of zinc active material.

The embodiment of my invention herein particularly shown and described is intended to be illustrative and not necessarily limitative of my invention since the same is subject to changes and modifications without departure from the scope of my invention which I endeavor to express according to the following claims.

I claim:

1. An alkaline-electrolyte storage battery comprising alternate nickel-positive and zinc-negative plates in a pack arrangement wherein each negative plate comprises a plurality of perforated metal strip pockets seamed together along their edges and containing active material wherein each perforated metal strip pocket of the negative plates comprises two metal strips perforated throughout their central portions lengthwise thereof and having the edges in telescoping interlocking engagement and the ends crimped closed, a felt separator applied across the opposite sides of each negative-zinc plate, an ionic-membrane tape wrapped around the felt-covered zinc-negative plate, and a plastic mesh insulator applied across the opposite sides of each positive-nickel plate.

2. The battery set forth in claim 1 wherein each of said pockets is filled with zinc-active material comprising powdered zinc metal and zinc oxide, and wherein after a plurality of said pockets are seamed together into a plate structure the same are compressed to retain the zinc active material in place and to hold the same in close electrical contact with the perforated metal strip.

3. The battery set forth in claim 2 wherein said compressive operation forms said metal strips with transverse corrugations to confine successive portions of the zinc active material in each strip pocket against displacement and migration during cycling of the battery.

4. The battery set forth in claim 3 wherein said zinc active material also includes a minor percentage of mercuric oxide and of polyvinylpyrolidone.

5. The battery set forth in claim 3 wherein said metal strips are 2 to 5 mils in thickness and have 3 to 15 mil perforations.

* * * * *